3,781,238
AQUEOUS CHAIN EXTENSION OF NCO PREPOLYMER WITH TERTIARY AMINO POLYOL USING NONIONIC SURFACTANT, AND AQUEOUS DISPERSION PRODUCED
Joan K. Helm, Buffalo, N.Y., assignor to Textron, Inc.
No Drawing. Continuation of abandoned application Ser. No. 768,892, Oct. 18, 1968. This application Aug. 4, 1971, Ser. No. 169,061
Int. Cl. C09d 5/02; C08g 22/14
U.S. Cl. 260—29.2 TN                                    24 Claims

ABSTRACT OF THE DISCLOSURE

There is disclosed a method for preparing an aqueous dispersion from a free isocyanate group-containing polyurethane prepolymer made from diisocyanate and polyoxypropylene polyol or polyoxybutylene polyol. The prepolymer is reacted with a defined tertiary aminopolyol, e.g., methyl diethanolamine, in the presence of a hydroxyl-containing, nonionic surface-acting agent and water. The resulting aqueous dispersion of polyurethane is particularly useful as a coating for various solid substrates.

---

This is a continuation of application Ser. No. 768,892, filed Oct. 18, 1968, now abandoned.

This invention relates to aqueous dispersions of polyurethanes which are particularly useful as coatings for various solid substrates. More particularly, the present invention concerns aqueous dispersions of polyurethanes and their preparation wherein the polyurethane is a reaction product essentially of diisocyanate, polyether polyol and polyhydroxy tertiary amine. The polyurethanes of these materials are formed as a stable dispersion in an aqueous medium through the action of hydroxyl-containing, nonionic surface active agents.

Polyurethane coating compositions are in essentially liquid form when applied to various substrates. It is possible that the polyurethane polymer itself can be a liquid and used as such as a coating, but most often the liquid composition contains the polyurethane dissolved or dispersed in a liquid medium. Such mixtures are frequently comprised of a solution of the polyurethane in substantial amounts of one or more organic solvents such as hydrocarbons or oxygen-containing materials. After these compositions are placed on a substrate, curing is accomplished or at least accompanied by evaporation of the solvent or other dispersing medium.

In some situations where substrates are coated with the polyurethane it may be possible and even economical to collect the dispersing medium as it evaporates from the coating and thus not unduly contaminate the atmosphere or subject workers to toxic conditions. Frequently, however, the expense of such collection is too great even when considering the value of the recovered dispersing medium. Moreover, it is often the case that collection of the evaporating vapors is empractical if not impossible and excessive pollution of the atmosphere with the organic dispersing medium is inevitable, even though obviously undesirable.

One approach to avoiding the expense of supplying the organic solvent and dealing with its attendant problems of atmospheric contamination and toxicity is to employ the polyurethane as an aqueous dispersion. Since water is reactive with isocyanate the polyurethanes which contain free isocyanate groups, for instance, as in the case of moisture-curing or two-can, polyol-curing polyurethanes, can not be employed in aqueous media. Thus polyurethanes in such media must be essentially free of isocyanate groups and cure primarily by the evaporation of the dispersing medium. Although the possible advantages of this approach are significant there has been very little commercialization of such aqueous dispersions. Problems encountered in making these materials include the difficulty of obtaining a good, stable dispersion of the polyurethane polymer in the aqueous medium. Moreover, after the composition has been applied to the substrate and cured, the resulting coating should exhibit satisfactory properties including good adherence to the substrate, flexibility, strength, physical and chemical stability, gloss, etc. Aqueous polyurethanes are disclosed in U.S. Pats. Nos. 2,968,575; 3,148,173; 3,213,049; 3,264,134; 3,281,397; and 3,294,724.

By the present invention it has been found that polyurethanes made essentially from diisocyanate, polyoxypropylene polyol or polyoxybutylene polyol, and polyhydroxy tertiary amines can be formed as aqueous dispersions through the use of hydroxyl-containing nonionic surface-active agents. These compositions when formed as cured coatings, have exhibited the desired characteristics needed for their successful adoption. In the formulations water may be the only dispersing medium present, however, it is more desirable to include some organic dispersing medium. Even in the latter case the benefits derived from the use of less of the organic material reduce costs, pollution and the extent to which people are exposed to toxic conditions. It is preferred that water be the major weight portion of the total amount of dispersing medium in the formulations. These dispersions are not dependent upon the neutralization of an acidic material to give a stable emulsion.

The compositions of this invention are made by first preparing a prepolymer of a hydrocarbon diisocyanate and the polyoxypropylene polyol or polyoxybutylene polyol. Although the diisocyanate and polyol can be reacted in the absence of a solvent, it is preferred to form the prepolymer in a solution of an organic material such as a hydrocarbon solvent. Also the prepolymer can be made in a more or less absence of solvent and subsequently combined with an organic solvent to form a solution. It is preferred that the prepolymer solution contain about 60 to 80 weight percent or even up to about 85 weight percent of polyurethane solids. The solvents which can be used in making these prepolymer solutions are normally liquid and essentially water-insoluble, e.g. aromatic hydrocarbons. The solvents frequently boil primarily in the range of about 230 to 350° F.

The polyurethane prepolymer whether in a solvent or not is mixed with water and the nonionic surface-active agent and then immediately the tertiary aminopolyol is added to the aqueous dispersion. Since the water is relatively slower reacting with the free isocyanate groups of the prepolymer than is the tertiary aminopolyol, the combination of the prepolymer and the dispersing water does not cause undue reaction of the free isocyanate group with the water, but rather the more or less immediate addition of the tertiary aminopolyol results in the reaction of this component with the prepolymer isocyanate groups. If desired, the tertiary aminopolyol can be added to the aqueous mixture of the prepolymer and surface-active agent, as a mixture with water and, if desired, surface-active agent. In any event, the amount of water present in the initial mixture of the prepolymer is often at least about 50 weight percent of the total water of the dispersion, preferably at least about 75 weight percent. The amount of tertiary aminopolyol incorporated in the dispersion is such that it is at least about 90 mole percent of the stoichiometrically required to react with the free isocyanate content of the prepolymer, and generally does not exceed about 110% of the stoichiometric amount, although a greater excess of this component could be present. It is preferred that the tertiary aminopolyol be used in an approximate stoichiometric amount based upon the isocyanate content of the polyurethane prepolymer.

As stated, the dispersing medium for the polyurethane can be composed entirely of water or be a mixture of water and organic material, but in any event, the water forms at least about 50 weight percent of the total of these dispersing agents. The polyurethane aqueous dispersion which may be referred to as an emulsion or latex since the cured polyurethane usually exhibits some elastomeric properties, often contains about 30 to 60 weight percent polyurethane solids. If these dispersions are composed of too little of the solids, the dispersions are unstable. Excessive amounts of polyurethane solids give dispersions which are of such high viscosity they are difficult to apply as coatings to various substrates. It is preferred that the aqueous dispersions contain about 40 to 50% polyurethane solids. The dispersions are conveniently made at temperatures in the range of about 15 to 40° C., preferably about 20 to 30° C. During mixing of the prepolymer and aqueous materials rapid agitation can decrease the mixing time required, and the use of lower temperatures can give less reaction with the water.

The tertiary aminopolyols which are reacted with the aqueous dispersion of the polyurethane according to this invention, have the structural formula:

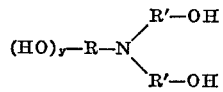

wherein $y$ is 0 or 1, R is a saturated aliphatic hydrocarbon radical of 1 to 4 carbon atoms, and R' is alkylene of 2 to 4 carbon atoms. Among these suitable tertiary aminopolyols are methyl diethanolamine, triethanolamine and isopropyl diethanolamine. The water-soluble tertiary aminopolyols are preferred.

The hydoxyl-containing nonionic surface-active agents used in making the aqueous dispersions of this invention include those corresponding to the formula:

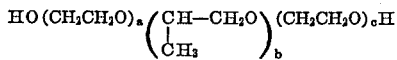

wherein $a$ and $c$ are numbers from about 80 to 150, and $b$ is a number from about 30 to 70. In the surface-active agents useful in this invention $a$ plus $c$ constitutes at least about 65%, preferably at least about 75%, up to about 95% of $a$ plus $b$ plus $c$. Also, these surface-active agents are normally solid and usually have molecular weights of about 8,000 to 20,000, preferably about 12,000 to 17,000. These materials are commercially available as Pluronic polyols, e.g. Pluronic F108, in which F indicates a solid form, 10 represents that $b$ is of such value that the polyoxypropylene groups have a total molecular weight of about 3250, i.e. $b$ is about 56, and 8 indicates that $a$ plus $c$ is about 80% of $a$ plus $b$ plus $c$. Thus Pluronic F108 has a molecular weight of about 16,250.

Another type of nonionic surface-active agent which can be employed in this invention is of the formula:

$$RO(CH_2CH_2O)_xH$$

wherein X is about 15 or 20 to 100, preferably about 20 to 60, and R is a hydrocarbon radical of about 10 to 20 carbon atoms, preferably without olefinic or acetylenic unsaturation. Typically R can be a normal or branched chain alkyl group as in the case of ethoxylated fatty alcohols or an alkylphenyl radical. In the latter the alkyl group often has about 5 to 12 carbon atoms, preferably 8 to 10 or even 9 carbon atoms. These surface-active agents are commercially available as ethoxylated nonyl phenols such as the Igepal CO surfactants which are designated by a three digit number. For instance, in Igepal CO–890, $x$ is 40 and thus the ethylene oxide groups constitute about 89 weight percent of the agent. In Igepal CO–850, $x$ is 20 and the weight percent of ethylene oxide is 80, while in Igepal CO–995, $x$ is 100 and the ethylene oxide is 95 weight percent. Igepal CO–995 is available as a 50% active solution.

The amount of the nonionic surface-active agent employed in forming the aqueous dispersions of this invention is relatively small but sufficent to give a relatively stable emulsion. Frequently, this amount is about 0.5 to 10 or more weight percent of the polyurethane prepolymer solids, preferably about 2 to 6 weight percent. Excessive amounts of surface-active agent increase costs and may increase the water sensitivity of the cured coatings made from the dispersions of this invention.

The essential reactants used in forming the polyurethane prepolymers of this invention are diisocyanate and polyoxypropylene polyol or polyoxybutylene polyol. Mixtures of these polyols can also be employed, but the polyoxypropylene polyols are preferred. These polyols can often have molecular weights of about 150 to 4000, preferably about 300 to 1800. Minor amounts of other polyols can also be employed in forming the polyurethane prepolymers, preferably such polyols do not exceed about 20 mole percent, or even not more than about 30 mole percent of the total polyol.

The polyoxypropylene polyols and polyoxybutylene polyols which are employed in this invention are those represented by the formula:

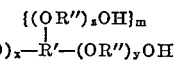

in which R' is a saturated aliphatic hydrocarbon radical, and R'' is an alkylene radical of 3 to 4, preferably 3, carbon atoms. R' preferably has 2 to 12, advantageously 2 to 6, carbon atoms. The letters $x$, $y$ and $z$ represent numbers the sum of which is about 2 to 80, depending on the molecular weight desired, preferably the sum is about 3 to 30. The letter $m$ is 0 or 1. R' may often be the same as R''.

Although diisocyanate is essential in preparing the prepolymers, minor amounts of other polyisocyanates may be present providing the compositions are not unduly deleteriously affected. In making the urethane prepolymer one or more of a variety of hydrocarbon diisocyanates can be employed. Thus, the diisocyanate may be aliphatic, aromatic or mixed aliphatic-aromatic structures. The aliphatic diisocyanates are preferred, especially when making urethanes exhibiting good resistance to the yellowing effects of ultraviolet light. The aliphatic diisocyanates include those having cycloaliphatic configurations and these are conveniently obtained by hydrogenation of the corresponding aromatic and mixed aromatic-aliphatic diisocyanates. The isocyanates may be substituted with non-interfering groups such as aliphatic hydrocarbon radicals, e.g., lower alkyl groups. The hydrocarbon portion of the diisocyanate often has at least about 4 carbon atoms and usually does not have more than about 24 carbon atoms. Diisocyanates of about 6 to 20 carbon atoms in the hydrocarbon group are preferred. Suitable diisocyanates include completely hydrogenated bis (isocyanato phenyl) methane, 1 - isocyanato - 3-isocyanatomethyl-3,5,5-trimethyl cyclohexane, hexamethylene diisocyanate, completely hydrogenated tolylene diisocyanate, 2,4,4-trimethylhexamethylene diisocyanate, 2,6-tolylene diisocyanate, p-phenylene diisocyanate, bis(4,4'-isocyanatophenyl)methane, 1,5-naphthalene diisocyanate, substituted aromatic and aliphatic diisocyanates, etc. The use of aromatic diisocyanates lowers the resistance of the urethane polymers to the effects of ultraviolet light.

The urethane prepolymers of the invention are essentially made by reaction of diisocyanates with the urethane-forming polyols. When the prepolymers are dispersed in water they are in the essentially liquid state either as the polymer per se or dissolved in a solvent. The prepolymer is generally stable in the sense that it will not cure to an insoluble solid unless further contacted with water, aliphatic polyol or other active-hydrogen containing material. These prepolymers can have a free isocyanate group content of about 1 to 15, often at least about 2 and preferably about 4 to 10, weight percent based on polymer content or solids. The prepolymer-forming reaction mixture generally contains a ratio of total isocyanate groups to total hydroxyl radicals of at least about 1.2:1, often up to about 3:1, preferably about 1.5 to 2:1. With a given prepolymer, increases in the ratio of NCO to OH provide coatings of greater film hardness and mar resistance while flexibility and impact resistance may be adversely affected, but these effects can be modified by using a longer chain polyol.

Aside from the polyoxypropylene polyol and polyoxybutylene polyol components used in making the prepolymer compositions of the present invention, there can be reacted, as noted, one or more other polyols. The polyols include aliphatic polyols and phenolic polyols. Such polyol is preferably composed to a major molar extent of diol including the ether diols, although triols or other polyols having greater than three hydroxy groups as well as their mixtures with diols can be employed. These polyols thus have at least two hydroxyl groups and may be selected from a wide variety of polyhydroxyl materials which may be aromatic, aliphatic, including cycloaliphatic, hydrocarbon compounds, including substituted-hydrocarbon compounds. These polyols may often have molecular weights of up to about 2000 or more, but preferably have molecular weights of about 100 to 1500. Among the relatively low molecular weight polyols which can be present in making the prepolymers are trimethylol propane, butane diols, trimethylol ethane, 1,6-hexamethylene glycol, 1,2,6-hexanetriol, bisphenol-A, etc.

As previously noted the isocyanate-polyol prepolymers are stable and preferably in an essentially liquid state, at least when in a solvent. There is a greater tendency to produce intractable prepolymer gels when the polyol contains a cross-linking component which has at least three hydroxyl groups per molecule. The prepolymer compositions of the present invention include those in which at least a portion of the polyol reactant has at least three hydroxyl groups per molecule such as those mentioned before, e.g. trimethylol propane, trimethylol ethane, 1,2,6-hexanetriol, etc., and their alkylene-oxide derived polyethers. However, the amount or degree of functionality of the polyol should not be so great that an intractable or non-reactive prepolymer is obtained. When the polyol component used in making the prepolymer contains cross-linking polyol, essentially the entire polyol may have at least about three hydroxyl groups per molecule, but large amounts of such polyol or polyols of high functionality may preclude the formation of elastomers.

The polyurethane-type prepolymer reaction products of the present invention can be made by simultaneous reaction of excess isocyanate and polyol. Alternatively, the diisocyanate can be reacted with part or all of one or more of the polyols prior to the reaction with the remaining portion of these materials. Stepwise mixing of the diisocyanate with the polyols may be used to enhance temperature control. The reaction temperatures for making the various urethane prepolymers of the present invention are often in the range of about 70 to 170° C. with about 80 to 90° C. being preferred; and the reaction is preferably continued until there is essentially little, if any, unreacted hydroxyl functionality remaining.

Catalysts can be used in forming the prepolymers to accelerate the rate of reaction. Typically the catalysts can be organotin compounds, for example dibutyl tin dilaurate and stannous octoate. Other useful catalysts include tertiary aliphatic and alicyclic amines, such as triethyl amine, triethanol amine, tri-n-butylamine, alkyl morpholines and the like. Complex mixtures containing such catalysts in modified form may also be employed.

The prepolymers of the present invention may be prepared in the presence of solvent which is essentially inert in this system. The solvent serves to insure that the reactants are in the liquid state and the solvent permits better temperature control during the reaction by serving as a heat sink and, if desired, as a refluxing medium. Various solvents including mixtures of such materials may be employed. The most useful organic solvents include the aromatic hydrocarbons. Frequently, the solvents are volatile materials which will be removed from the composition while it cures, and in such case, there may be no need to remove any portion of the solvent from the reaction product prior to use. The amount of solvent employed may vary widely and large volumes may be uneconomic or give materials with undesirably or inconveniently low viscosity. Often about 0.01 to 6 weights of solvent, preferably about 0.03 to 3 weights of solvent, per weight of the total isocyanate and polyol in the prepolymer are used. Among the suitable normally liquid solvents are toluene, xylene, ethylbenzene and commercially available solvent blends of high aromatic content. It is preferred that the solvent contain about 7 to 10 carbon atoms per molecule.

The urethanes of this invention can be employed in any way desired to take advantage of the characteristics of the products, for instance, the urethanes may be used as coatings, adhesives, laminants or flocculants or formed into relatively thick sheets or other film-like materials. Due to the elastomeric properties of the products they may be applied and employed in a manner to take advantage of such characteristics. The film-type products generally have a thickness of up to about 100 mils or more and often the coating compositions have a thickness of up to about 10 mils and can be applied to varied solid substrates such as wood, metal, textiles, etc. The urethanes can be formed into various materials or articles of greater cross-sectional dimensions, and the solutions can be employed in the various ways known in the art for utilization of these types of materials. The compositions can contain additives to impart special properties such as plasticizers, pigments, fillers, etc., also the solid substrates bearing the coating may be specially-treated materials, including flammable members impregnated with fire-resistant chemicals or coated with a sealant.

The following examples will serve to illustrate the present invention. In the technique the polyol component was initially azeotroped to remove water, and subsequently the urethane-prepolymer-formng reactions were conducted under an inert gas atmosphere in the usual manner. The percents NCO are reported on the basis of the total weight of polymer solids and solvent in the vehicle.

EXAMPLE I

Two hundred seventy-eight grams (3.2 equivalents of tolylene diisocyanate, 80/20 mixture of 2,4, and 2,6 isomers) were charged to a 3-liter flask which had a heating mantle, mechanical stirrer, reflux condenser thermometer dipping into the liquid, and an inlet for gaseous nitrogen. Tin octoate catalyst (0.2 gram) was also added to the mixture. With continuous stirring 800 grams (1.6 equivalents) of polyoxypropylene glycol of 1025 molecular weight were added slowly to the mixture. Within 30 minutes the temperature of the reaction mixture had risen to 71° C. when all of the glycol had been added. Heat was then applied and with continuous stirring under a blanket of gaseous nitrogen the temperature was kept at 80 to 90° C. for 4 hours. After cooling to room temperature 216 grams of toluene were stirred into the mixture to give 83.3 percent solids. The percent free isocyanate (NCO) in the product was 6.05. The prepolymer was used to prepare latex emulsions as described below.

EXAMPLE II

Eighty grams of water and 5 grams of Igepal CO–850 nonionic surfactant, polyoxyethylated nonylphenol having about 20 moles of $(CH_2CH_2O)$ per molecule, were placed in a quart size Waring Blendor and stirred at low speed for 2 minutes. One hundred twenty grams of the prepolymer whose preparation is described in Example I were added slowly and the mixture was stirred for 5 minutes on the low speed of the blender. A solution of 8.5 grams of methyl diethanol amine in 50 grams of water was prepared and poured into the blender allowing the stirring to continue for 20 minutes on low speed at room temperature. A uniform, stable emulsion was produced in this manner. Films cast at 3 mils (wet film) from this vehicle on Morest charts were continuous, translucent and somewhat tacky whether air dried or baked at 300° F. for 10 minutes.

EXAMPLE III

Five hundred fifty-six grams (6.4 equivalents) of tolylene diisocyanate, (80/20 mixture of 2,4 and 2,6 isomers) were charged to a 3-liter flask equipped with heating mantle, mechanical stirrer, thermometer inserted into the liquid, reflux condenser, and inlet tube to supply a blanket of nitrogen gas. Tin octoate (0.4 gram) was also added to the flask. Then with continuous stirring, 960 grams (3.2 equivalents) of polyoxypropylene glycols blended to give 600 molecular weight were added slowly to the flask over a one-hour period during which the temperature rose to 81° C. due to the reaction exotherm. Stirring was continued for four hours while maintaining the temperature between 80° C. and 90° C. using a heating mantle. After cooling slightly, 650 grams of toluene were added to dilute the prepolymer to 70 percent non-volatile. The percent free isocyanate was determined and found to be 6.3. This prepolymer was used to prepare a latex emulsion as described below.

EXAMPLE IV

Six hundred sixty-five grams of water and 70 grams of a 50 percent aqueous solution of Igepal CO–970 nonionic surfactant, polyoxyethylated nonylphenol having about 50 moles of $(CH_2CH_2O)$ per molecule, were charged to a stainless steel beaker. Using a variable speed, heavy-duty mixer, the solution was subjected to high speed agitation (approximately 6000 r.p.m.) while 1000 grams of the prepolymer of Example III were added in a continuous stream. Agitation was continued after complete addition for a period of five minutes. The agitation was reduced to approximately 2000 r.p.m. and the emulsion cooled to 18° C. Then a solution of 90 grams of methyl diethanolamine in 235 grams of water was added and the reaction mixture agitated for three hours at this speed with a slight exotherm. The latex emulsion produced was uniform and stable. A three-mil wet film cast on a Morest chart air-dried by solvent evaporation (about 30 minutes) to yield a smooth, tough, tack-free film with good adhesive properties.

EXAMPLE V

Ninety-five grams of water and 10 grams of a 50% aqueous Igepal CO–970 solution were charged to the Waring Blendor. While agitating at low speed at room temperature, 143 grams of prepolymer as prepared in Example III were added in a slow stream. Agitation was continued for one minute on low speed, then for one minute on high speed. The emulsion was transferred to a round bottom flask equipped with mechanical stirrer. Using moderate speed agitation, a solution of 10.7 grams of triethanolamine in 31 grams of water were added and stirring continued for about 3 hours. A stable emulsion at 40% solids was formed. Air-dried films of the emulsion were tough and tack-free similar to those obtained from the latex of Example IV.

EXAMPLE VI

One hundred grams of a 10% aqueous solution of Pluronic F–108 were cooled to 5° C. and added to a Waring Blendor jar. While using low agitation, 143 grams of the Example III prepolymer were added and the agitation continued for three minutes, one minute at low speed and two minutes at high speed. The emulsion was transferred to a flask and agitation resumed at moderate speed using a mechanical stirrer. The emulsion was cooled to approximately 20° C. after which a solution of 15.8 grams of isopropyl diethanolamine in 56 grams of water was added. There was a slight exotherm. A cooling bath was used to maintain a temperature of 20–25° C. After several hours of stirring, a stable urethane latex was formed. Wet films of 3-mil thickness were cast on Morest charts and allowed to air-dry. The dried films were continuous with considerable gloss and possessed a softer, tackier quality than those of Example IV.

EXAMPLE VII

One hundred seventy-four grams (2.0 equivalents) of tolylene diisocyanate (80/20 mixture of 2,4 and 2,6 isomers) were charged to a 2-liter flask equipped with heating mantle, mechanical stirrer, thermometer, reflux condenser and inlet tube to supply a blanket of nitrogen gas. Tin octoate (0.15 gram) was also added to the flask. Then with continuous stirring, 500 grams (1.0 equivalent) of a polyoxypropylene hexanetriol having a molecular weight of about 1500, were added over a period of 45 minutes in which the temperature rose to 60° C. Heat was applied to bring the temperature up to 80° and the temperature held at 80°–90° C. for four hours. The batch was then cooled slightly and 289 grams of toluene added. After cooling to room temperature, the percent free isocyanate (NCO) was determined and found to be 4.3. This prepolymer was used to prepare a latex emulsion as described below.

EXAMPLE VIII

Ninety-five grams of water and 10 grams of 50% aqueous Igepal CO–970 were charged to a Waring Blendor jar. While agitating at low speed, 143 grams of prepolymer prepared in Example VII were added and the mixture emulsified for one minute at low speed, then one minute at high speed. The emulsion was then transferred to a round-bottom flask equipped with mechanical stirrer and thermometer. With moderate agitation the prepolymer emulsion was cooled to 20° C. after which was added a solution of 8.7 grams of methyl diethanolamine in 27 grams of water. Stirring was continued for about 3 hours to yield a stable latex. Films were cast and air-dried as in Example IV to give tough, tack-free coatings with a small amount of opacity.

EXAMPLE IX

Three hundred eighty-eight grams (3.5 equivalents) of 1-isocyanato-3-isocyanatomethyl - 3,5,5 - trimethyl cyclohexane were charged to a 2-liter flask equipped with heating mantle, mechanical stirrer, thermometer, reflux condenser and inlet tube to supply a blanket of nitrogen gas. 0.77 gram dibutyl tin dilaurate was added to the flask. With continuous stirring, a solution of 22.8 grams (0.2 equivalent) of bisphenol A in 360 grams (1.8 equivalents) polyoxypropylene glycol of 400 molecular weight was slowly added to the flask over a period of 50 minutes. The temperature rose to 67° C. Heat was then applied to raise the temperature to 80° C. The reaction was allowed to continue for 4 hours at 80–90° C. After cooling slightly, 330 grams of toluene were added and the prepolymer solution at 70% solids allowed to cool to room temperature. The percent free isocyanate (NCO) was 5.6. This polymer was used to prepare a latex emulsion as described below.

EXAMPLE X

One hundred ninety grams of water and 20 grams of a 50% aqueous solution of Igepal CO-970 were charged to the Waring Blendor. While agitating on low speed, 286 grams of prepolymer as prepared in Example IX were added and the agitation continued for one minute on low speed and one minute on high speed. The emulsion was transferred to a round-bottom flask equipped with mechanical stirrer. Using moderate speed agitation, the prepolymer emulsion was chain-extended by the addition of a solution of 22.6 grams methyl diethanolamine in 63 grams of water. Agitation was continued for several hours since the system was slower reacting then tolylene diisocyanate systems, after which a stable latex resulted. Air-dried films prepared from the latex were hard and tack free with slight gloss and good non-yellowing properties when exposed to ultraviolet or sun light over extended periods of time.

It is claimed:

1. A method for forming a stable aqueous dispersion consisting essentially of reacting a mixture of water and polyurethane prepolymer of a hydrocarbon diisocyanate and a polyether polyol of the formula

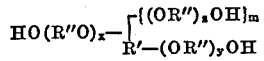

wherein R' is a saturated aliphatic hydrocarbon of 2 to 12 carbon atoms, R'' is alkylene of 3 to 4 carbon atoms, $x$, $y$ and $z$ are numbers the sum of which is about 2 to 80, and $m$ is 0 or 1, said polyether polyol having a molecular weight of about 150 to 4000, said prepolymer having from NCO groups, with sufficient tertiary aminopolyol to react with at least about 90% of said free NCO groups, said tertiary amino polyol being of the formula

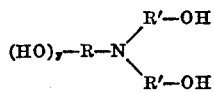

wherein $y$ is 0 or 1, R is saturated aliphatic hydrocarbon radical of 1 to 4 carbon atoms and R' is alkylene of 2 to 4 carbon atoms, said reaction being in the presence of a small amount of a nonionic surface-active agent sufficient to form a stable emulsion, said surface-active agent being of the formula

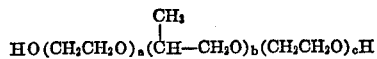

wherein $a$ and $c$ are numbers of about 80 to 150 and $b$ is a number of about 30 to 70, and $a+c$ is about 65 to 95% of $a+b+c$; or of the formula

wherein $x$ is about 15 to 100 and R is hydrocarbon of about 10 to 20 carbon atoms, the amount of said prepolymer reacted to form stable dispersion being about 30 to 60 weight percent of said stable dispersion.

2. The method of claim 1 wherein the prepolymer is dispersed in the water as a solution of 60 to 85 weight percent prepolymer in a liquid hydrocarbon solvent.

3. The method of forming the aqueous dispersion of claim 1 wherein the prepolymer is dispersed in water containing said surface-active agent and is subsequently reacted with said tertiary aminopolyol.

4. The method of forming the aqueous dispersion of claim 2 wherein the prepolymer is dispersed in water containing said surface-active agent and is subsequently reacted with said tertiary aminopolyol.

5. The method of claim 1 wherein R in the formula RO(CH$_2$CH$_2$O)$_x$H is alkylphenyl.

6. The method of claim 5 wherein the alkylphenyl is nonylphenyl.

7. A method for forming a stable aqueous dispersion consisting essentially of reacting a mixture of water and polyurethane prepolymer of a hydrocarbon diisocyanate and a polyether polyol of the formula

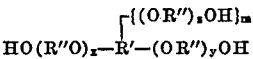

wherein R' is saturated aliphatic hydrocarbon of 2 to 6 carbon atoms, R'' is alkylene of 3 carbon atoms, $x$, $y$ and $z$ are numbers the sum of which is about 3 to 30, $m$ is 0 or 1, said polyether polyol having a molecular weight of about 150 to 4000, said prepolymer having free NCO groups, with sufficient water-soluble tertiary aminopolyol to react with at least about 90% of said free NCO groups, said tertiary aminopolyol being of the formula

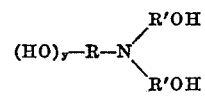

wherein $y$ is 0 or 1, R is saturated aliphatic hydrocarbon radical of 1 to 4 carbon atoms and R' is alkylene of 2 to 4 carbon atoms, said reaction being in the presence of an amount of 2 to 6 weight percent based on said prepolymer of a nonionic surface-active agent sufficient to form a stable emulsion, said surface-active agent being of the formula

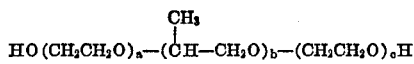

wherein $a$ and $c$ are numbers of about 80 to 150 and $b$ is a number of about 30 to 70, and $a+c$ is about 75 to 95% of $a+b+c$; or of the formula

wherein $x$ is about 20 to 60 and R is hydrocarbon of about 10 to 20 carbon atoms, the amount of said prepolymer reacted to form said stable dispersion being about 40 to 50 weight percent of said stable dispersion.

8. The method of claim 7 wherein the prepolymer is dispersed in the water as a solution of 60 to 85 weight percent prepolymer in a liquid aromatic hydrocarbon solvent, the water being at least about 50% of the total water and solvent.

9. The method of forming the aqueous dispersion of claim 7 wherein the prepolymer is dispersed in water containing said surface-active agent and is subsequently reacted with said tertiary aminopolyol.

10. The method of forming the aqueous dispersion of claim 8 wherein the prepolymer is dispersed in water containing said surface-active agent and is subsequently reacted with said tertiary aminopolyol.

11. The method of claim 7 wherein R in the formula RO(CH$_2$CH$_2$O)$_x$H is alkylphenyl.

12. The method of claim 11 wherein the alkylphenyl is nonylphenyl.

13. The method of claim 1 wherein the diisocyanate is toluene diisocyanate.

14. The method of claim 12 wherein the diisocyanate is toluene diisocyanate.

15. A stable aqueous dispersion produced by the method of claim 1.

16. A stable aqueous dispersion produced by the method of claim 2.

17. A stable aqueous dispersion produced by the method of claim 5.

18. A stable aqueous dispersion produced by the method of claim 6.

19. A stable aqueous dispersion produced by the method of claim 7.

20. A stable aqueous dispersion produced by the method of claim 8.

21. A stable aqueous dispersion produced by the method of claim 11.

22. A stable aqueous dispersion produced by the method of claim 12.

23. A stable aqueous dispersion produced by the method of claim 13.

24. A stable aqueous dispersion produced by the method of claim 14.

References Cited
UNITED STATES PATENTS

| | | | |
|---|---|---|---|
| 2,968,575 | 1/1961 | Mallonee | 260—29.2 TN |
| 3,264,134 | 8/1966 | Vill et al. | 260—29.2 TN |
| 3,281,397 | 10/1966 | Axelrood | 260—29.2 TN |
| 3,294,724 | 12/1966 | Axelrood | 260—29.2 TN |
| 3,491,050 | 1/1970 | Keberle et al. | 260—29.2 TN |
| 3,509,103 | 4/1970 | Teague et al. | 260—29.2 TN |

MURRAY TILLMAN, Primary Examiner

A. H. KOECKERT, Assistant Examiner

U.S. Cl. X.R.

117—161; 260—77.5 AM